(12) United States Patent
Gaiser

(10) Patent No.: US 8,752,369 B2
(45) Date of Patent: Jun. 17, 2014

(54) LATENT HEAT STORAGE CATALYST FOR AN EXHAUST SYSTEM IN AN INTERNAL COMBUSTION ENGINE

(75) Inventor: Gerd Gaiser, Reutlingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 124 days.

(21) Appl. No.: 13/357,256

(22) Filed: Jan. 24, 2012

(65) Prior Publication Data

US 2012/0117956 A1     May 17, 2012

Related U.S. Application Data

(63) Continuation of application No. PCT/EP2010/060580, filed on Jul. 21, 2010.

(30) Foreign Application Priority Data

Jul. 24, 2009 (DE) .......................... 10 2009 034 655

(51) Int. Cl.
*F01N 3/02* (2006.01)
*F01N 5/02* (2006.01)

(52) U.S. Cl.
USPC ........................................................ 60/320

(58) Field of Classification Search
USPC ...................................... 60/320; 165/10, 166
See application file for complete search history.

(56) References Cited

U.S. PATENT DOCUMENTS

| 4,073,284 A | 2/1978 | Laing .............................. 126/618 |
| 5,468,455 A | 11/1995 | Bruck ............................. 422/180 |
| 2005/0051294 A1 | 3/2005 | Fujita et al. ...................... 165/10 |
| 2006/0196632 A1 | 9/2006 | Kudo .............................. 165/10 |

FOREIGN PATENT DOCUMENTS

| CH | 666 118 A5 | 6/1988 |
| DE | 198 20 971 A1 | 11/1999 |
| DE | 103 29 153 A1 | 1/2005 |
| DE | 10 2004 052 106 A1 | 5/2006 |
| DE | 102004052106 | 5/2006 |
| EP | 0 596 854 A1 | 5/1994 |
| FR | 2081113 B1 | 8/1974 |
| WO | WO 2008/050210 A2 | 5/2008 |

OTHER PUBLICATIONS

English translation of DE 102004052106 A1, (May 2006).

*Primary Examiner* — Thomas Denion
*Assistant Examiner* — Jason Shanske
(74) *Attorney, Agent, or Firm* — Reinhart Boerner Van Deuren P.C.

(57) ABSTRACT

The invention relates to a latent heat storage catalyst (3) for an exhaust system (1) in an internal combustion engine, in particular of a motor vehicle, comprising a member (5) that includes several parallel ducts (6). First ducts (6') contain a phase change material (7), and second ducts (6") have a catalytic coating (14). In order to be able to produce said latent heat storage catalyst at a low cost, the member (5) is formed by at least one layered structure (9) comprising two metal sheets (10, 11), at least one of which is corrugated and which rest against each other and are attached to one another such that the ridges of the at least one corrugated metal sheet (10) form the ducts (6).

13 Claims, 5 Drawing Sheets

LATENT HEAT STORAGE CATALYST FOR AN EXHAUST SYSTEM IN AN INTERNAL COMBUSTION ENGINE

CROSS-REFERENCE TO RELATED PATENT APPLICATIONS

This patent application is a continuation of pending PCT Patent Application No. PCT/EP2010/060580, filed Jul. 21, 2010, which claims the benefit of German Application No. 102009034655.4, filed Jul. 24, 2009, the entire teachings and disclosure of which are incorporated herein by reference thereto.

FIELD OF THE INVENTION

The present invention relates to a latent heat storage catalyst for an exhaust system in an internal combustion engine, particularly of a motor vehicle.

BACKGROUND OF THE INVENTION

A latent heat storage device is particularly characterized by the use of a phase change material, which usually are salts, carries out a phase change between liquid phase and solid phase at the respective desired storage temperature. When charging the latent heat storage device, the heat storage material melts, while it solidifies during the discharge. Below the storage temperature, that is below the phase change temperature of the phase change material the latent heat storage device formed with the latter can only store sensitive heat, that is in the form of a temperature increase of the solid phase change material. Once the phase change material has been heated up to its phase change temperature it melts, which leads to a latent heat storage through the phase change. The heat thus stored in this case is stored at the temperature level of the storage temperature and can also be accessed at this temperature. In addition to this, the liquid phase change material can also be additionally heated, which again leads to a sensitive, that is temperature-dependent heat storage. By selecting the phase change material, the storage temperature of the latent heat storage device can be adapted to the respective operating purpose of the latent heat storage device.

Particularly in vehicle applications, latent heat storage devices can be used to keep the internal combustion engine or individual components of an exhaust system at operating temperature for as long as possible in order to increase the efficiency of the respective component or of the internal combustion engine. Since there is an increasing interest in such latent heat storage devices, there is a search for solutions for a cost-effective production which are particularly suitable for series production. Furthermore, it is attempted with latent heat storage devices to shorten the cold starting phases of active components of the exhaust system, such as for example of catalysts.

The present invention deals with the problem of stating an improved embodiment for a latent heat storage device and/or for a catalyst, which is particularly characterized in that it has an improved effectiveness and preferentially can be produced relatively cost-effectively.

BRIEF SUMMARY OF THE INVENTION

According to the invention, this problem is solved through the subject of the independent claims. Advantageous embodiments are the subject of the dependent claims.

The invention is based on the general idea of integrating a latent heat storage device in a catalyst or vice versa, in order to provide in this way a latent heat storage catalyst, which combines the functionalities of a catalyst and of a latent heat storage device in an integral component. In addition, the invention is based on the fundamental idea of forming a body of the latent heat storage catalyst by at least one layered structure which is produced with the help of several sheets. At least one of these sheets is corrugated. The sheets rest against each other and are attached to each other. Because of this, the corrugations of the at least one sheet forms ducts within the body, which run parallel to one another and of which at least some are filled with a phase change material, while others are coated in a catalytically active manner. Such a layered structure of sheets can be produced particularly easily and cost-effectively. In particular, it is also suitable for a series manufacture.

According to a preferred embodiment, the two sheets can be spirally wound so as to form the body or its layered structure. Because of this, a particularly cost-effective manufacturability is obtained, since the layered structure can be produced in a flat constellation quasi as endless material and can then be simply wound up into the body. Alternatively, it is likewise possible in principle to layer the two sheets in pairs in flat layers on top of each other in order to form the layered structure or the body.

With another embodiment it can be provided that the two sheets rest against each other along contact lines and are fastened to each other along such contact lines, for example by means of weld seams or soldered connections. Because of this, an intensive stiffening of the body is obtained, as a result of which it becomes very sturdy and can more preferably be of the self-supporting type which simplifies the accommodation in a housing, so-called canning.

In order to reduce thermally induced stresses within the body, it can be provided to loosely place the two sheets against each other along some such contact lines. In the region of these contact lines loosely resting against each other, relative movements between the two sheets can thus occur, which reduces the establishment of thermally induced stresses within the body.

In addition or alternatively it is possible to configure both sheets corrugated, as a result of which the sheets have a certain bending elasticity transversely to the longitudinal direction of the corrugations which makes it possible to offset or absorb thermal stresses.

According to a preferred further development it can be provided that the two sheets are attached to each other only along contact lines, which are arranged on both sides of first ducts filled with phase change material.

Optionally it can be provided that the two sheets loosely rest against each other along some other contact lines, e.g. between two catalytically coated second ducts.

Practically, the first ducts filled with phase change material can be closed at the ends and cannot be subjected to exhaust gas through flow while the catalytically coated second ducts in the body are arranged so that they can be subjected to an exhaust gas through flow.

Within the layered structure having at least two sheets the one sheet with the latent heat storage catalyst according to the invention is corrugated, while the other sheet can be smooth or non-corrugated. Alternatively, the other sheet can also be corrugated or likewise comprise corrugations.

Insofar as within the layered structure having at least two sheets the two sheets in each case are corrugated, the corrugation structures of the two corrugated sheets can have same wavelengths. In addition or alternatively, the wave structures of the two corrugated sheets can have different amplitudes. Additionally or alternatively, the corrugated sheets can rest against each other in phase with respect to their wave structures. In addition or alternatively, the corrugated sheets can rest against each other out of phase with respect to their wave structures, particularly by half a wavelength.

Of particular advantage is an embodiment, wherein the body is assembled of at least two layered structures, wherein a first layered structure comprises no second ducts and particularly only first ducts, while a second layered structure comprises no first ducts and particularly only second ducts. Because of this, a first layered structure representing the latent heat storage device and a second layered structure representing the catalyst can be produced separately from each other and only be "married" upon the assembly or the manufacture of the body in order to form the latent heat storage catalyst. The separate manufacturability of the different layered structures on the one hand simplifies the filling with phase change material and on the other hand the coating with catalytic material.

With a method for producing such a latent heat storage catalyst, at least one such first layered structure can be assembled with at least one such second layered structure.

With another advantageous embodiment it can be provided to select the phase change material so that its phase change temperature is at or above a start-up temperature of the respective catalytic material. Because of this, a stand-by function can be realized for the respective catalyst, since with the help of the phase change material the catalyst can be kept relatively long at the temperature level of the phase change temperature. Catalytic coatings, which are suitable for realizing such a stand-by function are for example three-way catalyst (TWC) or diesel oxidation catalyst (DOC). Alternatively (or, when using two different phase change materials, additionally) it is possible to select the phase change material so that its phase change temperature is at the upper end of a permissible operating temperature window of the respective catalyst. Because of this, an overheating of the respective catalyst can be avoided. If the temperature of the catalyst increases greatly and reaches the upper temperature limit of its operating temperature window, the phase change temperature is reached and the phase change material melts and in the process absorbs heat. During this latent heat absorption a temperature increase in the catalyst is greatly reduced, as a result of which said catalyst can be protected from overheating. Catalytic coatings, which are suitable for such a function are in particular NOX storage catalyst (NSK) and partial oxidation catalyst (POC). As indicated above, the latent heat storage catalyst of a special embodiment can realize both functionalities described above, when two different phase change materials are used in separate first ducts, which differ from each other in different phase change temperatures.

Further important features and advantages of the invention are obtained from the subclaims, from the drawings and from the corresponding Figure description by means of the drawings.

It is to be understood, that the features mentioned above and still to be explained in the following cannot only be used in the respective combination stated, but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar of functionally same components.

It shows, in each case schematically.

DETAILED DESCRIPTION OF THE INVENTION

Figure 1:
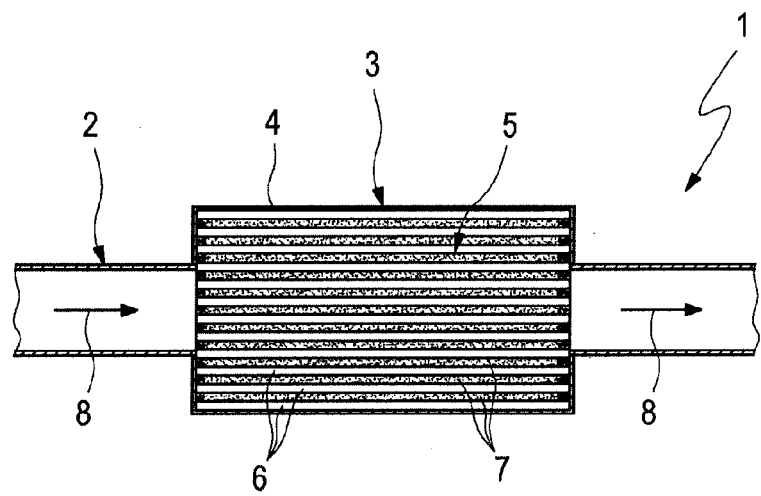
FIG. 1 a greatly simplified schematic representation of an exhaust system in the region of a latent heat storage catalyst, FIG. 2 to 12 sectional views through a part of a body of the latent heat storage catalyst with different embodiments.

According to FIG. 1, an exhaust system 1 of an internal combustion engine not otherwise shown, which can be more preferably arranged in a motor vehicle, comprises an exhaust line 2, in which a latent heat storage catalyst 3 is arranged or incorporated. The latent heat storage catalyst 3 contains a body 5 in a housing 4, which body comprises a plurality of ducts 6 which run parallel to one another and which in part contain a phase change material 7. Here, not all ducts 6 have to be filled with the phase change material 7. On the contrary, some of the ducts 6 are incorporated in the exhaust line 2 so that they can be subjected to a through flow of an exhaust gas flow 8 transported in the exhaust line 2. The ducts 6 filled with phase change material 7 are called first ducts in the following and in the sectional representations of FIG. 2 to 12 are designated 6'. Of the remaining ducts 6 which are not filled with the phase change material 7, some are provided with a catalytically active coating 14. The ducts 6 provided with the catalytic coating 14 are subjected to exhaust gas through flow during the operation of the exhaust system 1 and are called second ducts in the following, which in FIG. 2 to 12 are designated 6". In addition, further, third ducts 6 can also be present in principle, which neither contain phase change material 7 nor are provided with a catalytic coating 14.

According to FIG. 2 to 12, the body 5 with the latent heat storage catalyst 3 introduced here is formed by at least one layered structure 9, which contains the ducts 6 and which in the representations of FIG. 2 to 12 is sectioned transversely to the longitudinal direction of the ducts 6 and only partially represented. The respective layered structure 9 in this case is formed with at least two sheets 10, 11, of which at least the one sheet 10 is corrugated, while the other sheet 11 in the embodiments of FIG. 2 to 6 is non-corrugated or smooth and particularly configured flat. With the embodiments of FIGS. 7, 8, 11 and 12, the other sheet 11 is also of a corrugated design. With the embodiments of FIGS. 9 and 10, the other sheet 11 is partly corrugated and partly non-corrugated or even and more preferably designed flat.

To produce the respective layered structure 9, the two sheets 10, 11 are placed onto each other in the manner of layers and attached to each other. Here, the corrugations of the at least one sheet 10 jointly with the other sheet 11 form the ducts 6. Depending on the point of view, the corrugated sheet 10 rests against the other sheet 11 in the region of its parting lines of the wave crests or wave troughs facing the respective other sheet 11. Because of this, the contact is linear. In the case of linear wave structures, these contact lines are also linear. Along such contact lines, the two sheets 10, 11 are preferably attached to each other. Corresponding attachment points are symbolized in FIGS. 2 and 6 to 12 through thickened portions and designated 12. The fastening points 12 can be realized for example through weld seams or through soldered connections.

Figure 2:
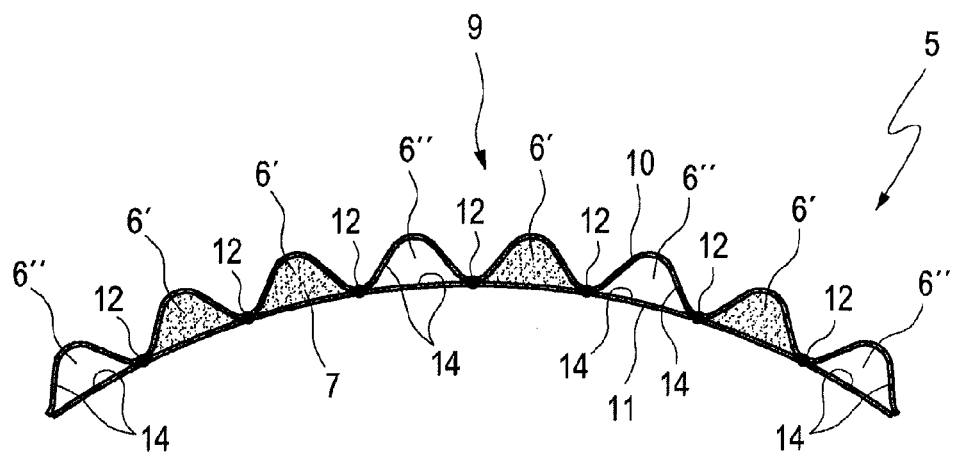
Figure 4:
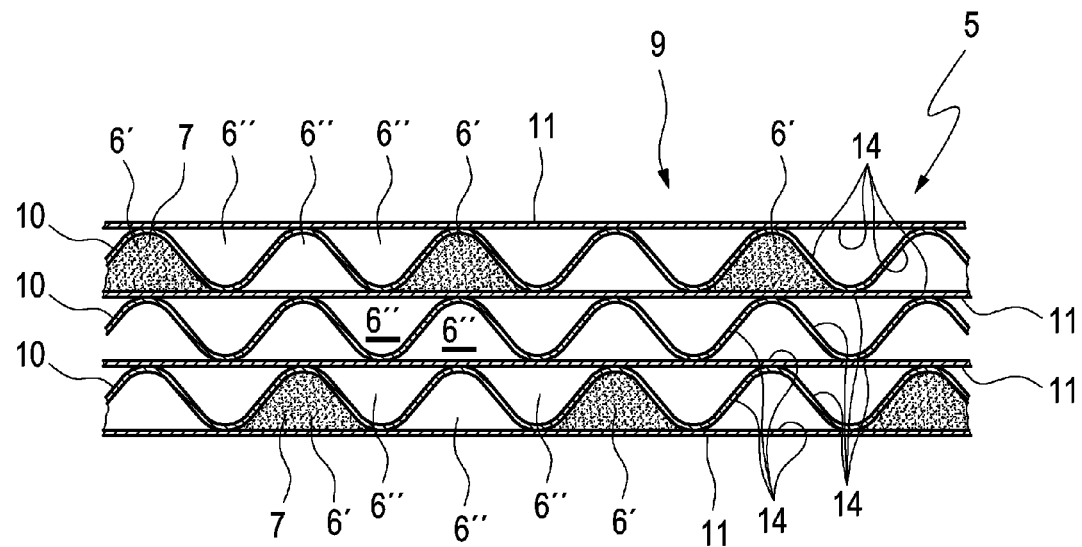
Figure 5:
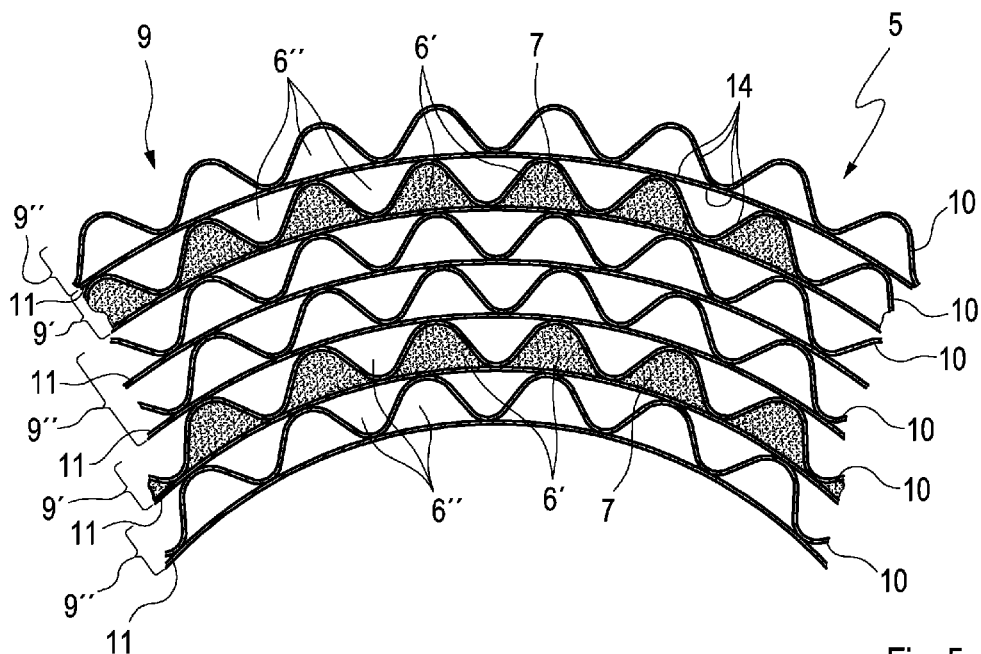

For producing the layered structure 9, the sheets 10, 11 can be spirally wound, which is indicated in the curved representations of FIGS. 2 and 5. It is likewise possible to layer or stack the two sheets 10, 11 in pairs in flat layers, which is indicated in FIGS. 3, 4 and 6 to 12.

Both manufacturing methods can be comparatively easily realized and are suitable more preferably for a series production.

Figure 3:
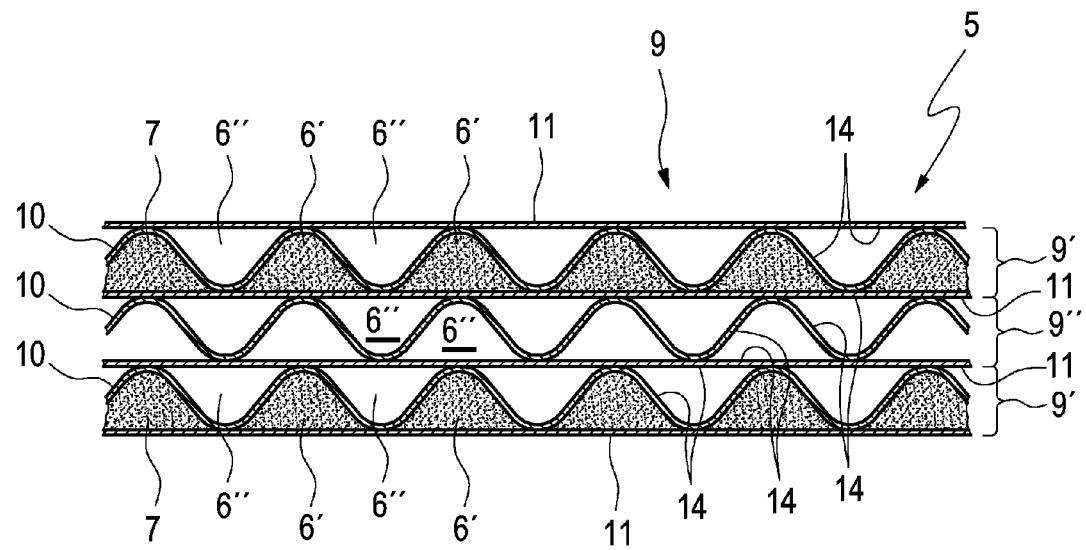

Of particular advantage is an embodiment indicated for example in FIGS. 3 and 5, wherein the body 5 is assembled of at least two layered structures 9, namely of at least one first layered structure 9' and of at least one second layered structure 9". Here, the first layered structure 9' has no second ducts 6'. In particular, the first layered structure 9' can also be designed so that it only has first ducts 6'. The second layered structure 9" has no first ducts 6'. In particular, the second layered structure 9" can be configured so that it only has second ducts 6'. Because of this, first layered structures 9" representing the latent heat storage device and second layered structures 9" representing the catalyst can be produced separately from each other and only be "married" upon assembly or the manufacture of the body 5 in order to form the latent heat storage catalyst 3. The separate manufacturability of the different layered structures 9', 9" on the one hand simplifies the filling with phase change material 7 and on the other hand the application of the coating 14 of catalytic material.

Figure 6:
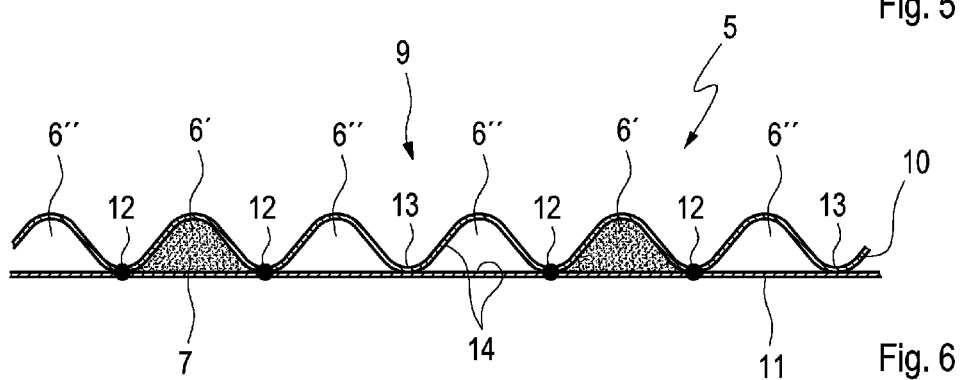
Figure 7:
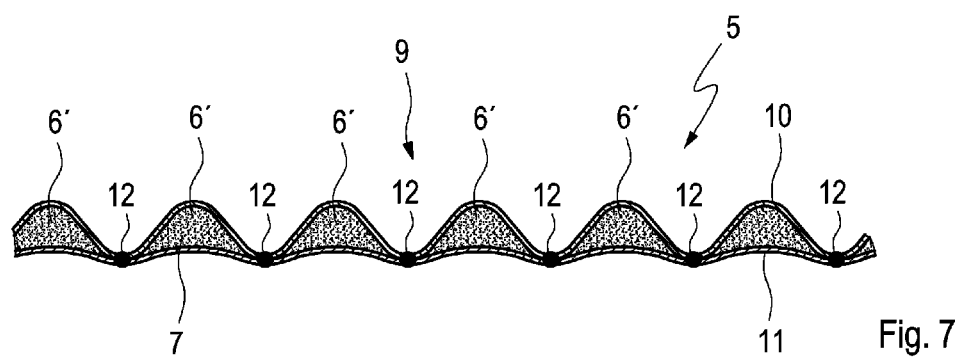
Figure 8:
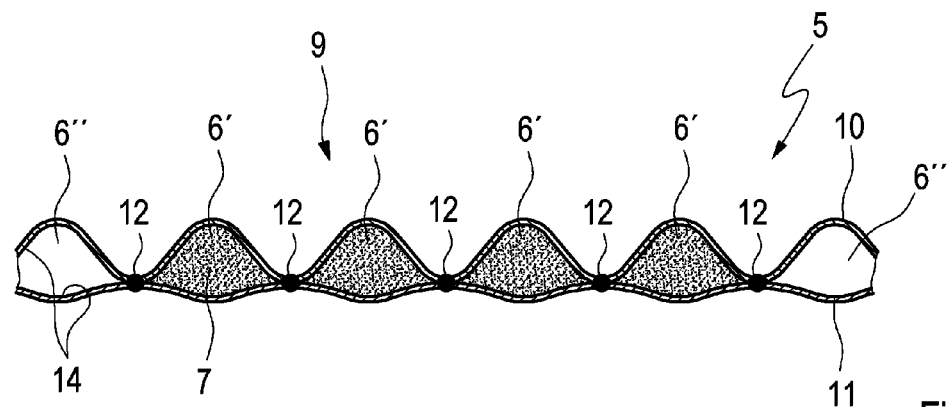
Figure 9:
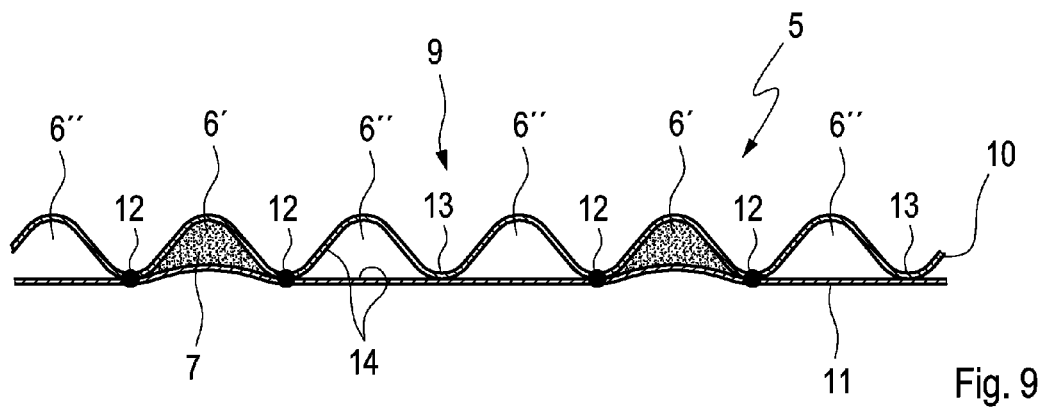
Figure 10:
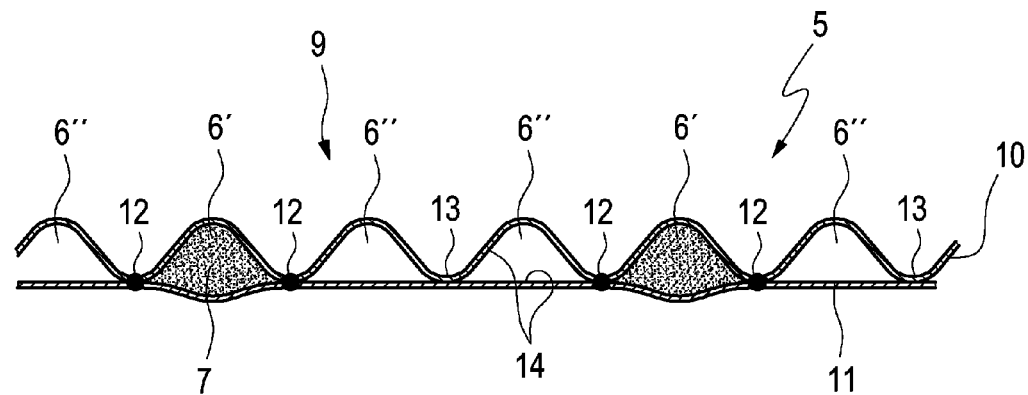

With the embodiments shown in FIGS. 2, 7, 8, 11 and 12 the two sheets 10, 11 are attached to each other along all contact lines. FIGS. 6, 9 and 10 by contrast show embodiments, wherein the two sheets 10, 11 are attached to each other only along such contact lines as are located on both sides of filled ducts 6'. In the region of the remaining contact lines, the two sheets 10, 11 rest loosely against each other. Such loose resting points are designated 13 in FIGS. 6, 9 and 10. Such a configuration makes possible relative movements between the two sheets 10, 11. Relative movements of this type can for example occur due to thermal expansion effects and reduce thermally induced stresses within the layered structure 9.

The first ducts 6' filled with the phase change material 7 are laterally closed off by the fastening points 12, which to this end are configured continuous. At its longitudinal ends, these filled first ducts 6' are likewise closed off in suitable manner. Through the closing-off of the filled first ducts 6' at the ends the phase change material 7 within these first ducts 6' is encapsulated towards the outside, so that it remains within the closed-off first ducts 6' intended for this purpose even in the liquid state. The catalytically coated second ducts 6" provided for conducting the gas are open at the ends. Through the number of filled first ducts 6' and catalytically active second ducts 6" and through their spatial arrangement within the layered structure 9, the heat storage capacity of the latent heat storage catalyst 3 and the catalytic activity of the latent heat storage catalyst 3 as well as the heat transfer within the latent heat storage catalyst 3 can be influenced. FIG. 3 to 5 purely exemplarily show different configurations, which lead to different storage capacities, catalyst capacities and heat transfer capacities. Furthermore, the number of catalytically active second ducts 6" can be predetermined through the maximum exhaust gas flow 8 that occurs in the exhaust system 1 or through the permissible through-flow resistance, as a result of which the dimensioning of the layered structure 9 is co-determined.

The ducts 6 that can be subjected to a through flow can at least partially be coated catalytically actively in order to form the catalytically active second ducts 6". Because of this, it is particularly easily possible to integrate the catalyst function in the latent heat storage catalyst 3. Because of this, the heat storage and the heat discharge within the latent heat storage catalyst 3 can take place directly where the heat may be required or is provided for charging the heat storage device 3. Because of this, the latent heat storage catalyst 3 works particularly efficiently.

To this end, the phase change material 7 can be selected so that its phase change temperature is at or above a start-up temperature of the respective catalytic material. Because of this, a stand-by function can be realized for the respective catalyst, since with the help of the phase change material 7 the catalyst can be kept relatively long at the temperature level of the phase change temperature. Catalytic coatings, which are suitable for realizing such a stand-by function, are for example three-way catalyst (TWC) or diesel oxidation catalyst (DOC). Alternatively (or when using two different phase change materials, additionally) it is possible to select the phase change material so that its phase change temperature is at the upper end of a permissible operating temperature window of the respective catalyst. Because of this, an overheating of the respective catalyst can be avoided. If the temperature of the catalyst increases greatly and reaches the upper temperature limit of its operating temperature window, the phase change temperature is reached and the phase change material 7 melts, absorbing heat in the process. During this latent heat absorption a temperature increase the catalyst is greatly reduced, as a result of which the latter can be protected from overheating. Catalytic coatings, which are suitable for such a function, are more preferably NOX storage catalyst (NSK) and partial oxidation catalyst (POC). As indicated above, the latent heat storage catalyst 3 of a particular embodiment can realize both functionalities described above when two different phase change materials 7 are used in separate ducts 6, which differ from each other through different phase change temperatures.

The embodiments of FIG. 7 to 12 show layered structures 9, wherein both sheets 10, 11 have corrugations. Here, the wave structures of both sheets 10, 11 preferably have the same wavelengths. This means, the spacing transversely to the wavelength direction between two immediately adjacent apexes is approximately identical in size with both sheets 10, 11. Furthermore, the wave structures of the two sheets 10, 11 according to the embodiments shown here can have different amplitudes. Noticeably, the first sheet 10 shown above in FIG. 7 to 12 has larger amplitudes, that is larger spacings between wave trough and wave crest than the lower or second sheet 11. For example, the amplitudes of the one sheet 10 are two to ten times larger than the amplitudes of the other sheet 11.

Insofar as both sheets 10, 11 have corrugations, thermally induced expansion effects can be better absorbed or offset within the layered structure 9.

Figure 11:
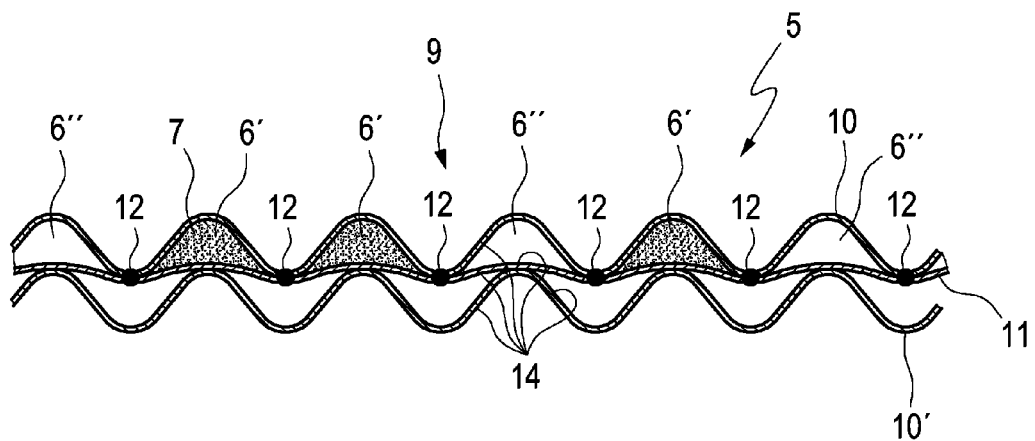
Figure 12:
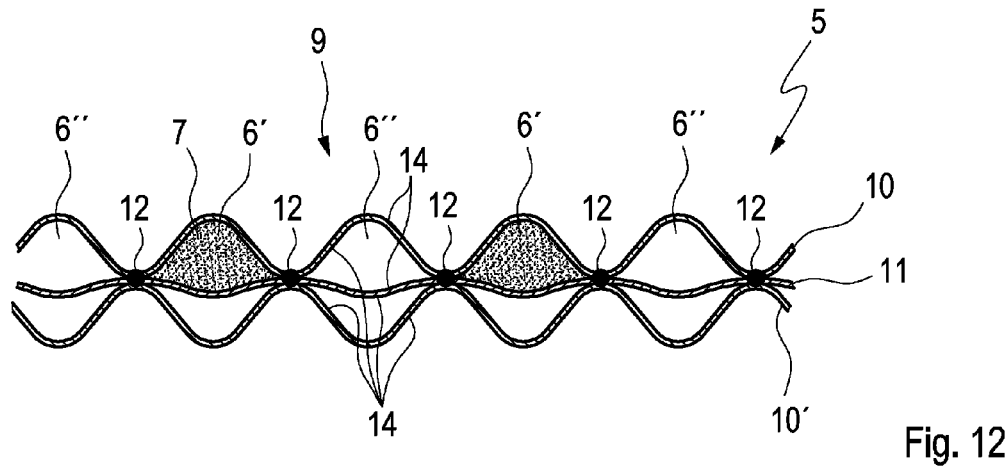

FIGS. 7, 9 and 11 show embodiments, wherein the sheets 10, 11 with respect to their wave structures rest against each other in phase. This means that the wave troughs of the one sheet 10 contact the other sheet 11 likewise in the region of wave troughs. Such a configuration can also be called a by-concave wave pairing. In contrast with this, FIGS. 8, 10 and 12 show configurations, wherein the sheets 10, 11 with respect to their wave structures rest against each other out of phase. In the example, the phase shift is half a wavelength. This is reflected in that the wave through of the one sheet 10 rest against the other sheet 11 in the region of its wave crests. Such a configuration can also be called concave-convex wave pairing. It is clear, that other phase shifts which are larger or smaller than half a wavelength are also possible.

FIGS. 9 and 10 show special embodiments, wherein between two adjacent filled first ducts 6' at least one catalytically active second duct 6" is arranged, wherein it is additionally provided to equip the second sheet 11 with a corresponding corrugation only in the region of the filled first ducts 6'. In the region of the catalytically active second ducts 6", the second sheet 11 with these embodiments is configured non-corrugated or smooth and particularly flat. The configuration shown in FIG. 9 can be called selective by-concave wave pairing, while the configuration shown in FIG. 10 can be called selective concave-convex wave pairing.

These configurations are characterized in that in the event that a plurality of catalytically active second ducts 6" are adjacent to each other within the storage structure 5, a higher mobility for offsetting thermal expansion effects is provided.

FIG. 11 shows an advantageous possibility for the arrangement of adjacent wave pairs or corrugated sheet pairs for a by-concave wave pairing. Noticeably, an adjacent further first sheet 10' is positioned in phase with the sheets 10, 11 of the completely shown wave pairing, so that the wave crests of the further first sheet 10' facing the second sheet 11 of the wave pairing are in contact in the region of the wave crests of the second sheet 11 of the wave pairing. Through the in-phase arrangement within the wave pairing, the contact lines of the adjacent sheet 10' lie between the contact lines within the wave pairing.

With the configuration shown in FIG. 12, the further sheet 10' with its wave crests likewise lies in the region of the wave crests of the facing second sheet 11 of the wave pairing. Through the phase shift within the wave pairing, the contact lines between the further sheet 10' and the second sheet 11 of the wave pairing in this case coincide with the contact lines within the wave pairing. The arrangement proposed here produces a particularly compact construction.

The invention claimed is:

1. A latent heat storage catalyst for an exhaust system of an internal combustion engine of a motor vehicle, comprising:
   a body comprising a plurality of ducts including first ducts and second ducts running parallel to one another,
   wherein the first ducts contain a phase change material,
   wherein second ducts comprise a catalytic coating,
   wherein the body is formed by at least one layered structure with at least two sheets, of which at least one is corrugated and which rest against each other and are fastened to each other in such a manner that the corrugations of the at least one corrugated sheet form the first and second ducts.

2. The latent heat storage catalyst according to claim 1, wherein the at least two sheets are spirally wound.

3. The latent heat storage catalyst according to claim 1, wherein the at least two sheets are layered on top of each other in pairs in flat layers.

4. The latent heat storage catalyst according to claim 1, wherein the at least two sheets rest against each other along contact lines and are attached to each other along such contact lines.

5. The latent heat storage catalyst according to claim 3, wherein the at least two sheets are attached to each other only along contact lines, which are arranged on both sides of the first ducts.

6. The latent heat storage catalyst according to claim 4, wherein the at least two sheets loosely rest against each other along some contact lines.

7. The latent heat storage catalyst according to claim 1, wherein the first ducts filled with phase change material are closed off at a first end and a second end and cannot be subjected to exhaust gas through flow while the catalytically coated second ducts can be subjected to through flow of exhaust gas.

8. The latent heat storage catalyst according to claim 1, wherein at least one of the at least two sheets is smooth or non-corrugated.

9. The latent heat storage catalyst according to claim 1, wherein the other of the of the at least two sheets is also corrugated or has corrugations.

10. The latent heat storage catalyst according to claim 9, wherein the corrugations of the at least two sheets form wave structures and the at least two sheets have the same wavelengths.

11. The latent heat storage catalyst according to claim 9, wherein the corrugations of the at least two sheets form wave structures and the at least two sheets have different amplitudes.

12. The latent heat storage catalyst according to claim 9, wherein the corrugations of the at least two sheets form wave structures and the at least two sheets rest against each other in phase.

13. The latent heat storage catalyst according to claim 9, wherein the corrugations of the at least two sheets form wave structures and the at least two sheets rest against each other out of phase by half a wavelength.

\* \* \* \* \*